(12) United States Patent
Chou et al.

(10) Patent No.: US 9,204,401 B2
(45) Date of Patent: Dec. 1, 2015

(54) METHOD AND SYSTEM FOR THE MANAGEMENT OF CELL INTERFERENCE IN A WIRELESS COMMUNICATION NETWORK

(71) Applicant: Intel IP Corporation, Santa Clara, CA (US)

(72) Inventors: Joey Chou, Scottsdale, AZ (US); Hong He, Beijing (CN); Ana Lucia Pinheiro, Breinigsville, PA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/125,726

(22) PCT Filed: Sep. 27, 2013

(86) PCT No.: PCT/US2013/062395
§ 371 (c)(1),
(2) Date: Dec. 12, 2013

(87) PCT Pub. No.: WO2014/109802
PCT Pub. Date: Jul. 17, 2014

(65) Prior Publication Data
US 2015/0036597 A1 Feb. 5, 2015

Related U.S. Application Data

(60) Provisional application No. 61/752,386, filed on Jan. 14, 2013.

(51) Int. Cl.
*H04W 52/24* (2009.01)
*H04W 52/28* (2009.01)
(Continued)

(52) U.S. Cl.
CPC ............ *H04W 52/243* (2013.01); *H04L 47/12* (2013.01); *H04L 47/20* (2013.01); *H04W 24/02* (2013.01);
(Continued)

(58) Field of Classification Search
None
See application file for complete search history.

(56) References Cited

U.S. PATENT DOCUMENTS

| 8,229,451 B2 | 7/2012 | Frenger et al. |
| 2010/0151876 A1 | 6/2010 | Park et al. |

(Continued)

FOREIGN PATENT DOCUMENTS

KR   100835480 B1   6/2008

OTHER PUBLICATIONS

"International Application Serial No. PCT/US2013/062395, International Search Report mailed Oct. 30, 2013", 3 pgs.

(Continued)

*Primary Examiner* — Ashley Shivers
(74) *Attorney, Agent, or Firm* — Schwegman Lundberg & Woessner, P.A.

(57) ABSTRACT

A method and system for managing inter-cell interference for a plurality of neighboring wireless communication cells in a wireless network is disclosed. Power data indicative of a received power level for a signal from the base station for any user equipment in an outer region of a cell is determined by a base station for each of a plurality of neighboring cells. Number data indicating at least one of a number and a relative number of user equipments within the outer region of a cell is also determined by each base station from the timing of a signal between the base station and the user equipment. The power data and the number data is transmitted to a central manager, where the power data and the number data for the cells is processed to compute a power level in each of a plurality of sub-bands for transmission by each base station. The computed power level in each sub-band is transmitted back to each base station for the control of the power level transmitted by the base station in each sub-band.

35 Claims, 9 Drawing Sheets

(51) Int. Cl.
   *H04W 24/10*     (2009.01)
   *H04W 24/02*     (2009.01)
   *H04W 28/02*     (2009.01)
   *H04L 12/813*    (2013.01)
   *H04L 12/801*    (2013.01)
   *H04W 28/08*     (2009.01)

(52) U.S. Cl.
   CPC .......... *H04W 24/10* (2013.01); *H04W 28/0247* (2013.01); *H04W 28/0252* (2013.01); *H04W 28/08* (2013.01); *H04W 52/244* (2013.01); *H04W 52/283* (2013.01)

(56) References Cited

U.S. PATENT DOCUMENTS

2015/0003348 A1\* 1/2015 Ishii et al. .................... 370/329
2015/0139004 A1\* 5/2015 Fodor et al. ................... 370/252

OTHER PUBLICATIONS

"International Application Serial No. PCT/US2013/062395, Written Opinion mailed Oct. 30, 2013", 5 pgs.

\* cited by examiner

METHOD AND SYSTEM FOR THE MANAGEMENT OF CELL INTERFERENCE IN A WIRELESS COMMUNICATION NETWORK

CROSS REFERENCE TO RELATED APPLICATIONS

The present application is a U.S. National Stage Filing under 35 U.S.C. 371 from International Patent Application Serial No. PCT/US2013/062395, filed Sep. 27, 2013, which claims priority to U.S. Provisional Patent Application Ser. No. 61/752,386, filed Jan. 14, 2013, entiled "Advance Wireless Communication Systems and Techniques," all of which are incorporated herein by reference in their entirety.

FIELD

Embodiments generally relate to the field of wireless communication, and more particularly to a method and system for the management of cell interference in a cellular wireless communication system.

BACKGROUND INFORMATION

In wireless communication networks conforming to the $3^{rd}$ Generation Partnership Project (3GPP) Long-Term Evolution (LTE) standard, inter-cell interference is a major cause of impact on the coverage and capacity of LTE cells, where there is a high frequency reuse between cells to provide better spectrum efficiency. The degradation of cell coverage and capacity is especially prominent in the performance perceived by cell edge users, due to interference from neighboring cells. Inter-cell Interference Coordination (ICIC) based on a frequency domain approach can be used to mitigate inter-cell interference seen by cell edge users by coordinating the allocation of radio resource blocks among neighboring cells.

BRIEF DESCRIPTION OF THE DRAWINGS

Embodiments will be readily understood by the following detailed description in conjunction with the accompanying drawings. To facilitate this, description, like reference numerals designate like structural elements. Embodiments are illustrated by way of example and not by way of limitation in the figures of the accompanying drawings.

DETAILED DESCRIPTION

Figure 1:
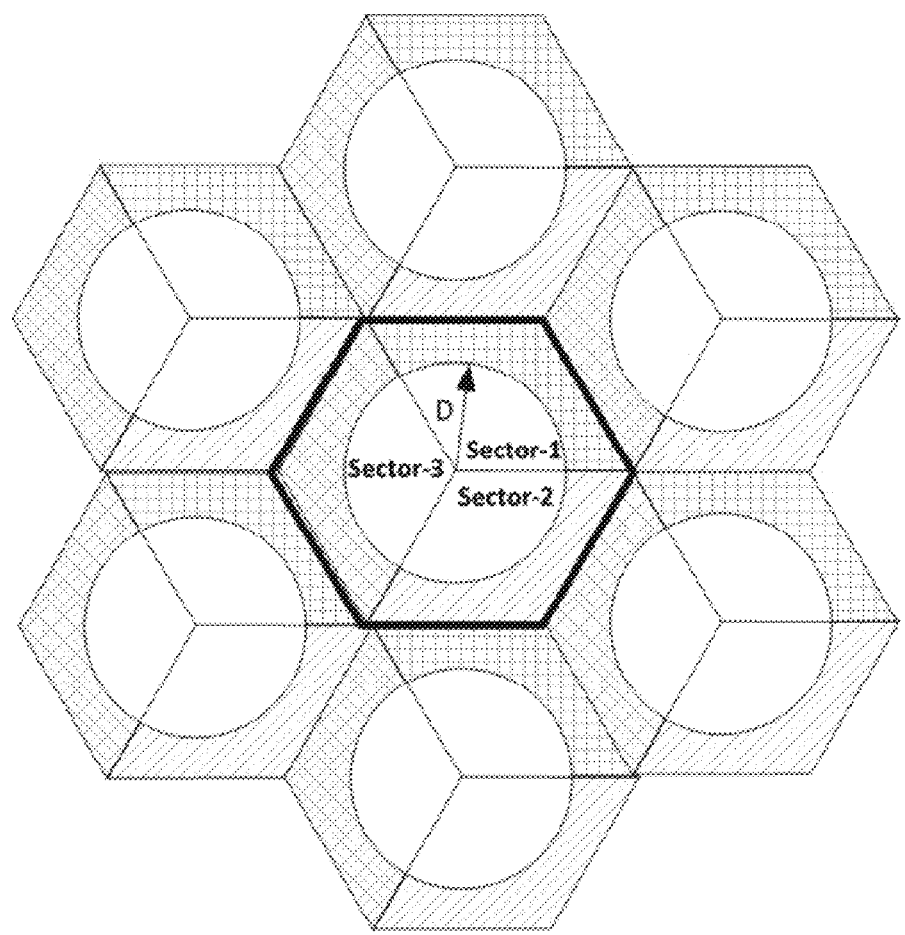
FIG. 1 illustrates a cellular wireless network deployment based on a soft frequency re-use method according to one embodiment.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. The software can also be provided on any form of carrier medium for carrying the code. The carrier medium can include a storage medium as described above and a transitory medium such as a signal. Such a signal can be electrical, optical, electromagnetic, acoustic, or magnetic. Specifically, it can comprise a signal transmitted over a network such as a Local Area Network (LAN), a wide area network (WAN) or internet and can for example comprise a TCP/IP signal.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the term "module" may refer to, be part of, or include an Application-Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Example embodiments may be described herein in relation to wireless communication networks including networks such as 3$^{rd}$ Generation Partnership Project (3GPP) Long-Term Evolution (LTE) networks including any amendments, updates, and/or revisions (e.g., LTE Release 10 (also referred to as LTE-Advanced (LTE-A), LTE Release 11, etc.), Worldwide Interoperability for Microwave Access (WiMAX) networks, and the like. The embodiments described herein may operate in relation to a radio access network, e.g., an evolved Universal Terrestrial Radio Access Network (E-UTRAN) having evolved node base stations (eNBs), and a core network, e.g., an evolved packet core having gateways, management entities, etc.

In other embodiments, communication schemes described herein may be compatible with additional/alternative communication standards, specifications, and/or protocols. For example, embodiments of the present disclosure may be applied to other types of wireless networks where similar advantages may be obtained. Such networks may include, but are not limited to, wireless local area networks (WLANs), wireless personal area networks (WPANs) and/or wireless wide area networks (WWANs) such as cellular networks and the like.

FIG. 1 illustrates a cellular wireless network deployment based on a soft frequency re-use method for use in a LTE cellular system according to one embodiment.

Figure 2:
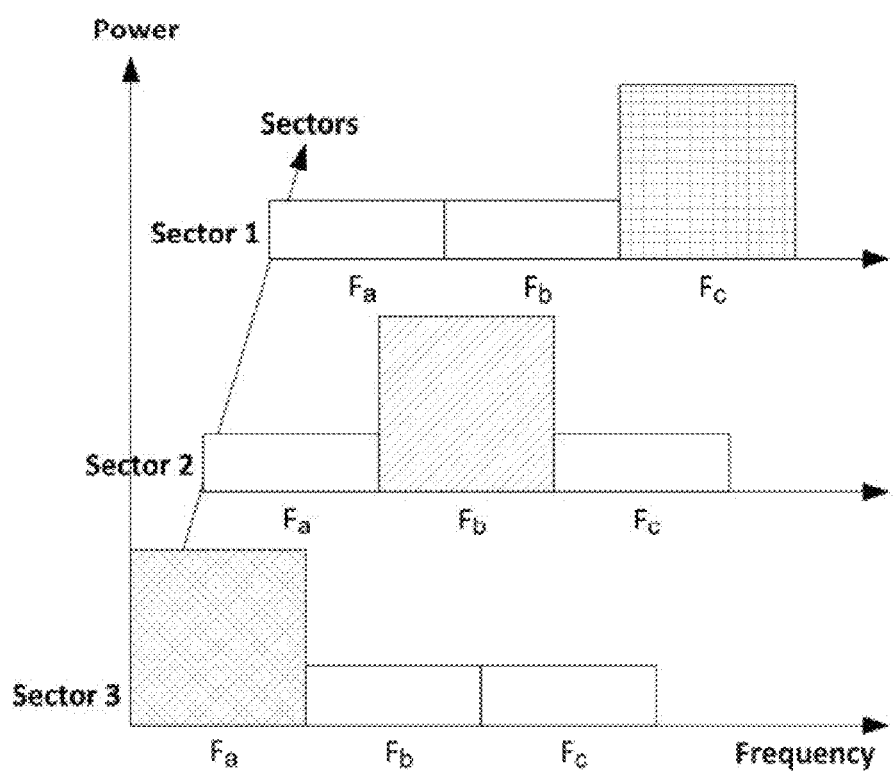
FIG. 2 illustrates the allocation of power in frequency sub-bands used in the embodiment of FIG. 1.

A central area is shown as a central hexagon surrounded by six neighboring cells. Each area is served by a base station (eNodeB) and has a central region shown as a circle, which represents a region closest to the base station (ENodeB). The central region is defined as a region having a maximum radius of D. Each area is divided into three sectors, each comprising a cell and having an outer region, which are shown as different shaded areas in FIG. 1. Hence, each base station (eNodeB) has three cells corresponding to each sector. The spectral capacity is divided based on a soft Fractional Frequency Reuse (FFR) concept where different power levels are used for radio resource blocks allocated to inner and outer regions as shown in FIG. 2. $F_a$, $F_b$ and $F_c$ are sub-bands that each equal ⅓ of the channel bandwidth allocated to each cell. As can be seen in FIG. 2, in the outer region of sector 1, high power is transmitted in sub-band $F_c$, while low power is transmitted in sub-bands $F_a$ and $F_b$. In the outer region of sector 2, high power is transmitted in sub-band $F_b$, while low power is transmitted in sub-bands $F_a$ and $F_c$. In the outer region of sector 3, high power is transmitted in sub-band $F_a$, while low power is transmitted in sub-bands $F_b$ and $F_c$. As can be seen in figure, an outer region of sector 1 abuts an outer region of sectors 2 and 3 in two neighboring cells and hence the interference at the outer cell of multiple neighboring cells can be significantly reduced, since they transmit power on different sub-bands.

To support ICIC in the control plane, 3GPP RAN3 defines a few X2 messages, such as Relative Narrowband TX Power (NTP) for downlink, and Overload Indicator (OI) and High Interference Indication (HII) for uplinks. HII and RNTP include one bit per Physical Resource Block (PRB) to indicate if interference is above the predefined threshold of not for uplinks and downlinks respectively. It does not have the granularity to indicate different levels of interference a User Equipment (UE) in an outer cell region may experience. The interference measurement is based on the Reference Signal Receive Power (RSRP). The inventors have realized that reliance on the RSRP measurement is an inaccurate method of determining the number of UEs in the outer region due to the fact that UEs in the inner region may receive poor RSRP due to obstructions.

In order to overcome this limitation in the use of RSRP for UE location proximity determination, a timing signal transmitted from the eNodeB to the UE is used to calculate the UE proximity to the eNodeB.

Figure 3:
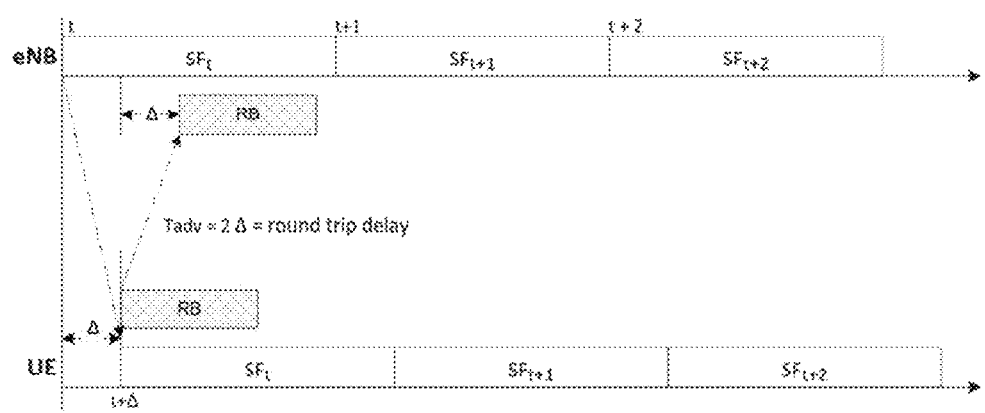
FIG. 3 is a timing advance diagram according to one embodiment.
Figure 4:
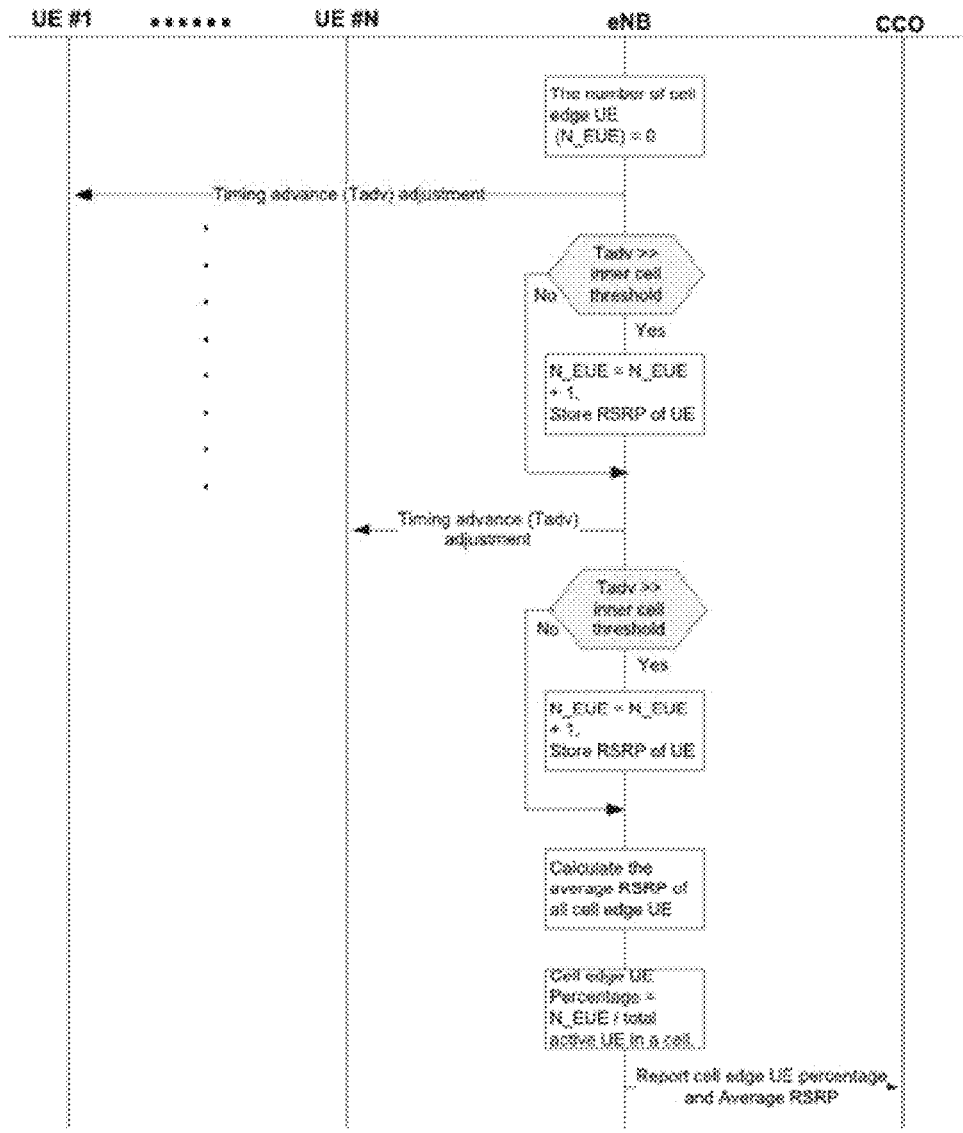
FIG. 4 is a flow diagram illustrating the method of determining the number of cell edge UEs according to one embodiment.

To maintain uplink time alignment where the uplink bursts from all UEs should arrive time aligned at the eNodeB, the eNodeB needs to transmit a Timing Advance signal ($T_{adv}$) periodically to all UEs in each cell. FIG. 3 illustrates that the time advance of the signal $T_{adv}$ is equivalent to the round trip delay between an UE and the eNodeB. The UE will need to transmit the uplink burst at time t−$T_{adv}$ so that the burst can arrive at the eNodeB at time t. Hence, the eNodeB in the LTE wireless cellular network is provided with the necessary capability to determine the proximity of UEs to the eNodeBs. Therefore, the eNodeB is able to determine the number of UEs located in the outer cell region by counting the number of UEs whose timing advance exceeds a threshold corresponding to the perimeter D in FIG. 1. This can be calculated from D=($T_{adv}$×C)/2, where C is the speed of light. Therefore, the eNodeB is able to measure the number of UEs as an absolute number or as a relative number by comparison to the number of UEs in the inner cell region The method of determining a relative number for UEs in the outer cell region and for obtaining a power measurement for the UEs will now be described with reference to FIG. 4.

The number of UEs in the outer cell region (cell edge users) is initially set to zero–(N_EUE=0). The eNodeB performs the timing advance adjustment process to determine the time advance $T_{adv}$ for each UE in the cell and for each measurement for each UE, it determines whether the timing advance signal is greater than the threshold equating to the distance D. If the timing advance $T_{adv}$ for a UE is greater than the threshold, the count N_EUE is incremented and the RSRP for the UE is stored. For example, if the radius of the inner region is 5 km, the one way propagation delay=5/3000000=1.67 μs. Hence the threshold is 3.34 μs. When all neighboring UEs have been processed in this manner, the average RSRP is calculated from the stored RSRP values for all the UEs having a $T_{adv}$ greater than the threshold by summing the linear values converted from dBm units and dividing by N_EUE. Also, the relative number (percentage) of UEs in the outer cell region (cell edge users) is calculated by dividing the count of the number of UEs in the outer cell region N_EUE by the total number of UEs in the cell. The average value determined for the RSRP for the UEs in the outer region and the value for the percentage of UEs in the outer cell region are transmitted over a network to a remote computer device hosting software performing the function of Coverage and Capacity Optimization (CCO). The CCO receives the values for multiple neighboring cells from neighboring eNodeBs for processing as will be described with reference to FIG. 5.

Figure 5:
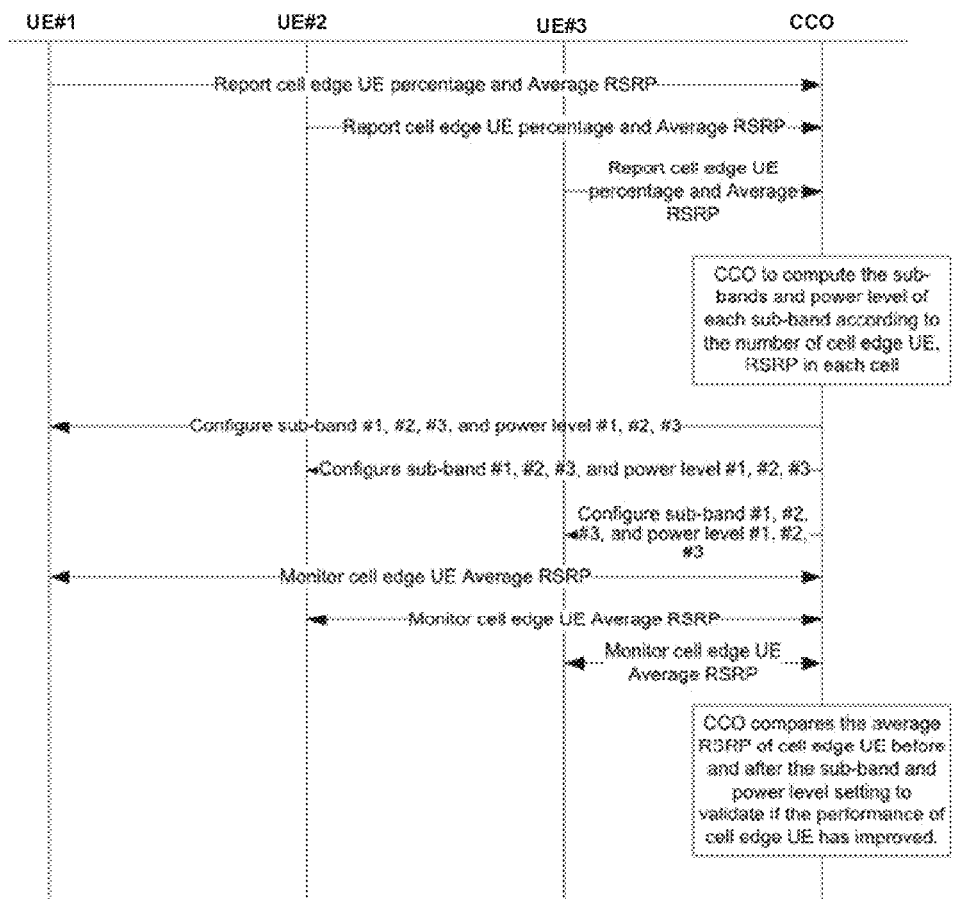
FIG. 5 is a flow diagram illustrating the method of dynamically allocating the power and sub-bands for the eNBs according to one embodiment.

In FIG. 5 the operation of the centrally operated computer system performing the CCO function is illustrated. The purpose of the CCO is to optimize the performance of the UEs in the outer cell regions and optimize the overall cell spectrum efficiency. The CCO receives the values for percentage of UEs in the outer cell region and the average RSRP for these UEs from each eNodeB for neighboring cells. Using these values, the CCO computes the sub-bands and the power level of each sub-band for each eNodeB for each outer cell subregion. The CCO then transmits the computed sub-bands and power levels for each sub-band as a control signal to each respective eNodeB for the control of the transmitted power of the resource blocks by the eNodeB to be used by the UEs located in the outer cell regions to effect optimization of the performance of the UEs in the outer cell regions and the optimization of the spectrum efficiency. The eNodeBs them monitor the average RSRP in the manner described herein above and transmit the determined average values to the CCO. The CCO compares the average RSRP values for the UEs in the outer cell regions after the sub-band and power level changes with the average RSRP values for the UEs in the outer cell regions before the sub-band and power level changes to validate the performance of the optimization algorithm. The algorithm used to determine the sub-bands and the power levels is adjusted in dependence upon this comparison, such as for example, if there has been no improvement.

In this manner the centralized CCO function can dynamically or semi-statically allocate sub-bands and power levels of each sub-band to the inner and outer regions of multiple neighboring cells in such a way as to achieve optimal uplink and downlink performance for UEs in outer cell regions and optimal spectrum efficiency across multiple cells. The measurement to trigger CCO function is the number of active UEs in an outer region of the cell in a time interval. When there are no UEs in the outer cell region the eNodeB is controlled by the CCO to allocate all sub-bands with lower power level for the UEs in the inner cell region to achieve the best spectrum efficiency with minimum interference to neighboring cells. When there are UEs in the outer cell regions, the eNodeB is controlled by the CCO to allocate the sub-bands and power levels according to the number of UEs in the outer cell regions.

Figure 6:
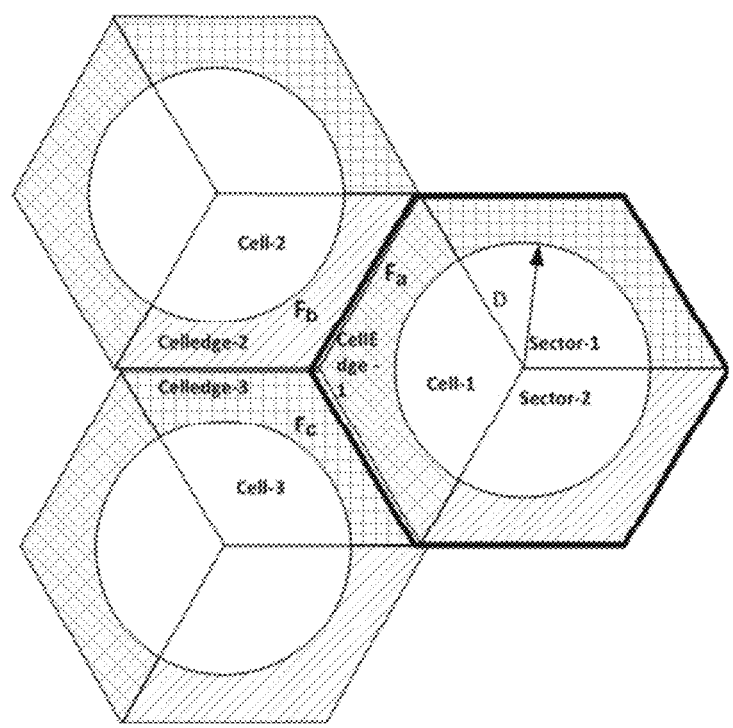
FIG. 6 illustrates one control scenario for a cellular wireless network deployment controlled according to the method of one embodiment.

Scenarios for control will now be described with reference to FIG. 6 which illustrates three neighboring cells. If the outer cell regions Celledge-1, Celledge-2 and Celledge-3 have zero or very few UEs, then all three cells can use all spectrum resources for the UEs in the inner cells i.e. the sub-bands are all set to low power. If the outer cell regions Celledge-1, Celledge-2 and Celledge-3 all have a significant number of UEs, then sub-bands $F_a$, $F_b$ and $F_c$ need to be set for Celledge-1, Celledge-2 and Celledge-3 respectively. This means that the resources allocated to UEs in the inner region will be reduced. If the outer region Celledge-1 has more UEs, but the outer regions Celledge-2 and celledge-3 have less, then sub-band $F_a$ in cell-1 is set high and sub-bands $F_b$ and $F_c$ in cell-2 and cell-3 can be set lower. If the outer regions Celledge-1 and celledge-2 have more UEs, but the outer regions Celledge-3 has less, then sub-band $F_a$ and $F_b$ in cell-1 and cell-2 are set high and sub-band $F_c$ in cell-3 is set lower. It should be noted that the overall transmit power for each cell should be kept constant.

The apparatus for implementing the method of dynamically or semi-statically managing inter-cell interference for a plurality of neighboring wireless communication cells in a wireless network will now be described with reference to FIGS. 7a and 7b.

Figure 7A:
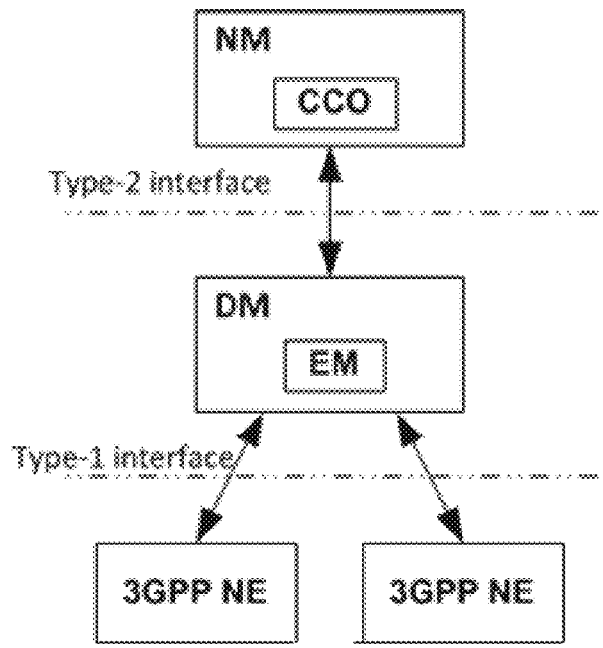
FIGS. 7a and 7b illustrate the apparatus for implementing the interference coordination method according to alternative embodiments.

FIG. 7a is a schematic illustration of a system in which multiple 3GPP Network Elements (NE) are connected by a Type-1 interface to a Domain Masnager (DM), which implements an Element Manager (EM). Multiple such Domain Managers can be iconnected by a Type-2 interface to a Network Manager (NM), which in this embodiment hosts the CCO. The Network Element comprises the eNodeB base stations as described above. These comprise digital processing apparatuses with wireless transmitters and receivers for transmitting and receiving signals to and from wireless apparatus or handsets termed UEs above. The Domain Manager comprises digital processing apparatus for processing communication data. The Element Manager can be provided by software implemented on the processing apparatus. The Network Manager comprises digital processing apparatus for processing communication data and the CCO can be provided by software implemented on the processing apparatus. The interfaces between these apparatuses comprise communication links such as networks.

Figure 7B:
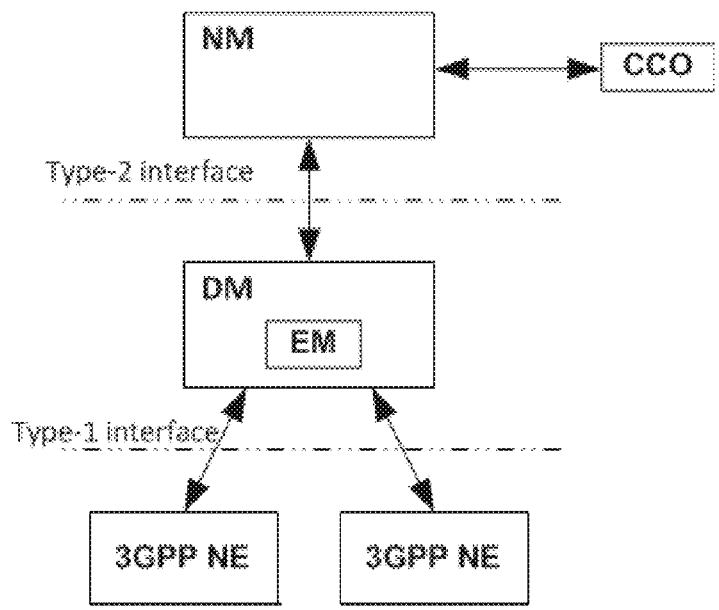

FIG. 7b illustrates and alternative embodiment to FIG. 7a in which the CCO is not hosted by the Network Manager but is instead provided separately such as on another processing apparatus.

In the embodiments of FIGS. 7a and 7b, the eNodeB comprises a base station system which includes an antenna array for the transmission of signals to user elements in one of more cells and the reception of signals from user elements in one of more cells.

Although the above embodiments are described with reference to the division of a cell into three sectors, in alternative embodiments, the cell can be divided into any number of sectors.

Although the relative number of UEs in an outer region of a cell are determined as a percentage of the total UEs in a cell in the embodiment described, in alternative embodiments, the algorithm could determine the number of UEs in the outer region relative to the number in the inner region, or even an absolute number i.e. are there any UEs in the outer cell region.

Figure 8:
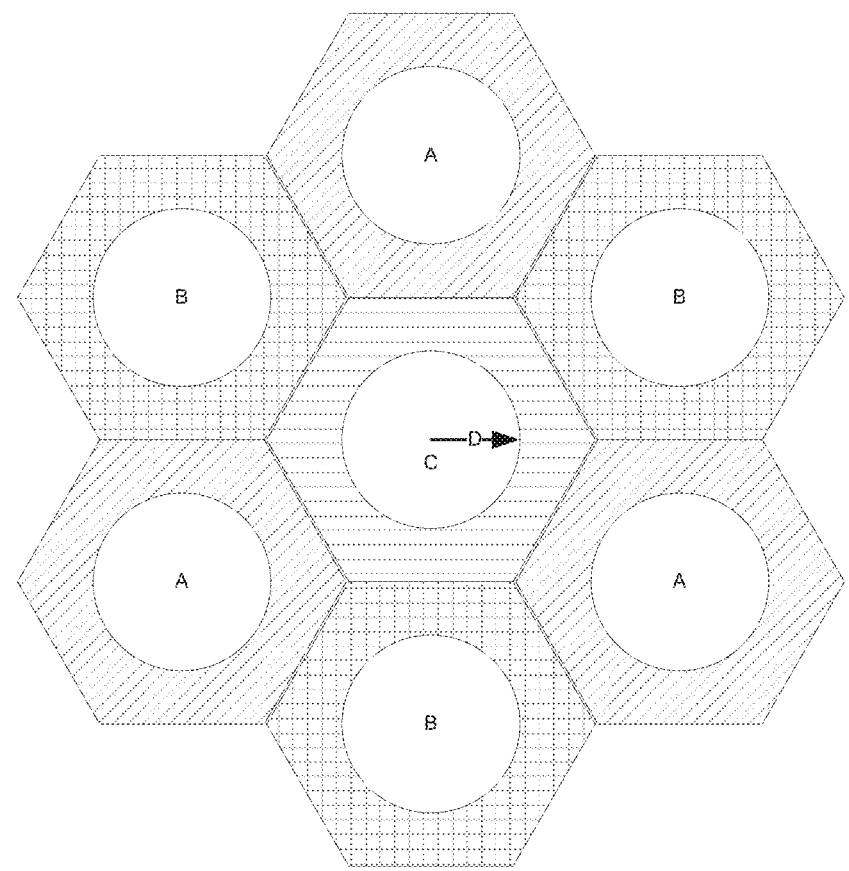
FIG. 8 illustrates a cellular wireless network deployment based on a soft frequency re-use method according to another embodiment.
Figure 9:
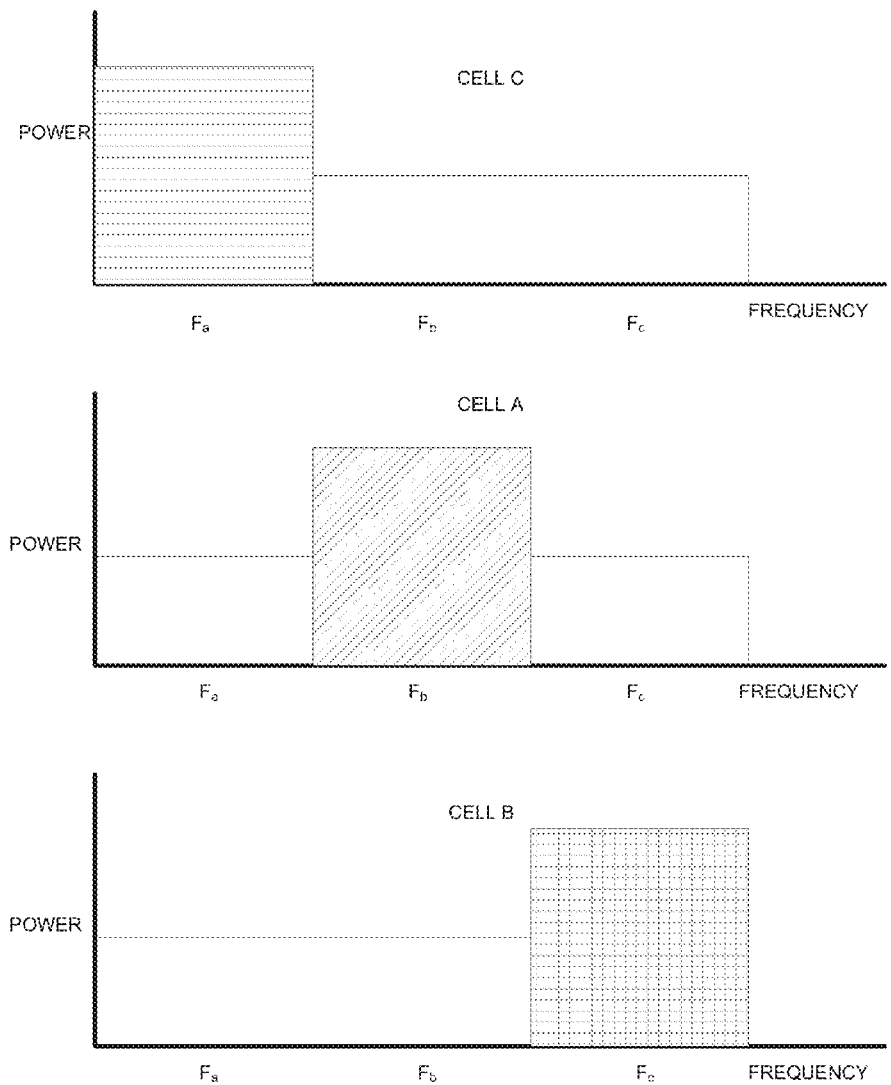
FIG. 9 illustrates the allocation of power in frequency sub-bands used in the embodiment of FIG. 8

Although in the above embodiments, reference has been made to the soft FFR, the invention is applicable to other frequency reuse scenarios. FIGS. 8 and 9 illustrate an alternative embodiment in which the base station (eNodeB) has only one cell and hence one outer region. In this embodiment, the frequency reuse is lower since each outer cell region can only use ⅓ of the bandwidth. The base station for the central cell C transmits high power on sub-band $F_a$ to the outer region of the central cell C. The base stations for the neighboring cells A each transmit high power on sub-band $F_b$ to the outer region of each respective neighboring cell A. The base stations for the neighboring cells B each transmit high power on sub-band $F_c$ to the outer region of each respective neighboring cell B.

The determination of the number or relative number of user equipments in the outer region compared with the inner region can be determined as for the other embodiment by determining the power level for a reference signal transmitted by the base station and using a reference timing signal transmitted from the base station to the user equipment. The information on these can be transmitted to a central controller for the plurality of cells for the implementation of a control algorithm to determine the power levels for the sub-bands (and whether the use of high power transmission to the outer region is require i.e. when there are no or few user equipments in the outer cell region). The central controller can then transmit control signals to the base stations where the control signal is used to control the power level and sub-bands of the transmitted signal to user equipments in the cell.

In the following listed embodiments, any embodiment can be used in combination with any other embodiment.

One embodiment of the invention provides a method of managing inter-cell interference for a plurality of neighboring wireless communication cells in a wireless network, the method comprising receiving, from each of a plurality of base stations, power data indicative of a received power level for a signal from the base station for any user equipment in an outer region of a cell, and number data indicating at least one of a number and a relative number of user equipments within the outer region of a cell, the number data being obtained at each base station from the timing of a signal between the base station and the user equipment, the outer region of each cell abutting the outer region of neighboring cells; processing the received data for the cells to compute a power level in each of a plurality of sub-bands for transmission by each base station; and transmitting the computed power level in each sub-band to each base station for the control of the power level transmitted by the base station in each sub-band to the inner and outer regions of a corresponding cell.

In one embodiment the received data for the cells is further processed to allocate the sub-bands to be used, and the allocation of the sub-bands is transmitted with the computed power level to each base station.

In one embodiment the number data received from each base station comprises an indication of the number of user equipments in the outer region relative to the number of all user equipments in a cell.

In one embodiment the power data from each base station is indicative of an average received power level for a signal from the base station for all user equipments in the outer region of a cell.

In one embodiment each base station communicates with user equipments in a plurality of cells lying in a plurality of different sectors around the base station, each sector having a respective outer region, and the power data and the number data is determined by a base station for each cell.

In one embodiment the method further comprises receiving further power data indicative of a received power level for a signal from the base station for at least one user equipment in the outer region of a cell after the control of the power level transmitted by the base station in each sub-band, determining if the inter-cell interference has improved, and if not, modifying the computing of the power level for use in future computations.

In one embodiment the wireless network comprises a $3^{rd}$ Generation Partnership Project (3GPP) Long-Term Evolution (LTE) network, the base station comprises an eNodeB, the timing signal is a timing advance signal used to maintain uplink time alignment, and the received power level comprises a Reference Signal Receive Power (RSRP) for each user equipment (UE).

One embodiment of the present invention provides a computer apparatus for managing inter-cell interference for a plurality of neighboring wireless communication cells in a wireless network, the apparatus comprising an interface for receiving, from each of a plurality of base stations, power data indicative of a received power level for a signal from the base station for any user equipment in an outer region of a cell, and number data indicating at least one of a number and a relative number of user equipments within the outer region of a cell, the number data being obtained at each base station from the timing of a signal between the base station and the user equipment, the outer region of each cell abutting the outer region of neighboring cells; and a processor for processing the received data for the cells to compute a power level in each of a plurality of sub-bands for transmission by each base station; wherein the interface is controlled by the processor to transmit the computed power level in each sub-band to each base station for the control of the power level transmitted by the base station in each sub-band to the inner and outer regions of a corresponding cell.

In this embodiment, the processor can comprise any form of processor means, which can comprise one or a plurality of processors, one or a plurality of micro-processors, one or a plurality of Application Specific Integrated Circuits (ASICS), or one or a plurality of processing devices.

In this embodiment, the interface can comprise any form of interface means, which can comprise a parallel interface, serial interface, USB interface, network interface such as a local area network interface (LAN), wide area network interface (WAN), virtual private network interface (VPN) or other interface to the internet.

In one embodiment the processor is adapted to further process the received data for the cells to allocate the sub-bands to be used, and the network interface is controlled to transmit the allocation of the sub-bands with the computed power level to each base station.

In one embodiment the number data received from each base station comprises an indication of the number of user equipments in the outer region relative to the number of all user equipments in a cell.

In one embodiment the power data from each base station is indicative of an average received power level for a signal from the base station for all user equipments in the outer region of a cell.

In one embodiment each base station communicates with user equipments in plurality of cells lying in a plurality of different sectors around the base station, each sector having a respective outer region, and the power data and the number data is determined by a base station for each cell.

In one embodiment the network interface is further adapted to receive further power data indicative of a received power level for a signal from the base station for at least one user equipment in the outer region of a cell after the control of the power level transmitted by the base station in each sub-band, the processor is adapted to determine if the inter-cell interference has improved, and if not, to modify the computing of the power level for use in future computations.

In one embodiment the wireless network comprises a $3^{rd}$ Generation Partnership Project (3GPP) Long-Term Evolution (LTE) network, the base station comprises an eNodeB, the timing signal is a timing advance signal used to maintain uplink time alignment, and the received power level comprises a Reference Signal Receive Power (RSRP) for each user equipment (UE).

One embodiment of the invention provides a non-transient storage medium storing code for controlling a processor to manage inter-cell interference for a plurality of neighboring wireless communication cells in a wireless network, the storage medium storing code to control a processor to receive, from each of a plurality of base stations, power data indicative of a received power level for a signal from the base station for any user equipment in an outer region of a cell, and number data indicating at least one of a number and a relative number of user equipments within the outer region of a cell, the number data being obtained at each base station from the timing of a signal between the base station and the user equipment, the outer region of each cell abutting the outer region of neighboring cells; code to control a processor to process the received data for the cells to compute a power level in each of a plurality of sub-bands for transmission by each base station; and code to control a processor to transmit the computed power level in each sub-band to each base station for the control of the power level transmitted by the base station in each sub-band to the inner and outer regions of a corresponding cell.

In one embodiment the code for controlling the processor to receive data for the cells includes code to control the processor to further process the received data to allocate the sub-bands to be used, and the code for controlling the processor to transmit includes code to control the processor to transmit the allocation of the sub-bands with the computed power level to each base station.

In one embodiment the number data received from each base station comprises an indication of the number of user equipments in the outer region relative to the number of all user equipments in a cell.

In one embodiment the power data from each base station is indicative of an average received power level for a signal from the base station for all user equipments in the outer region of a cell.

In one embodiment each base station communicates with user equipments in plurality of cells lying in a plurality of different sectors around the base station, each sector having a respective outer region, and the power data and the number data is determined by a base station for each cell. In one embodiment the code further comprises code for controlling the processor to receive further power data indicative of a received power level for a signal from the base station for at least one user equipment in the outer region of a cell after the control of the power level transmitted by the base station in each sub-band, code to control the processor to determine if the inter-cell interference has improved, and code to control the processor if not, to modify the computing of the power level for use in future computations.

In one embodiment the wireless network comprises a $3^{rd}$ Generation Partnership Project (3GPP) Long-Term Evolution (LTE) network, the base station comprises an eNodeB, the timing signal is a timing advance signal used to maintain uplink time alignment, and the received power level comprises a Reference Signal Receive Power (RSRP) for each user equipment (UE).

One embodiment of the invention provides an eNodeB base station for managing inter-cell interference from a plurality of neighboring wireless communication cells in a $3^{rd}$ Generation Partnership Project (3GPP) Long Term Evolution (LTE) network, the eNodeB comprising a processor for determining power data indicative of a received power level for a signal from the eNodeB for any user equipment in an outer region of a cell, the received power level comprising a Reference Signal Receive Power (RSRP) for each user equipment, the outer region of each cell abutting the outer region of neighboring cells, and for determining number data indicating at least one of a number and a relative number of user equipments within the outer region of a cell, the number data being determined from the timing of a signal between the eNodeB and the user equipment, the timing signal being a timing advance signal used to maintain uplink time alignment; an interface to transmit the power data and the number data to a computer system to compute a power level in each of a plurality of sub-bands for transmission by the eNodeBs, the computing comprising computing the power level for a plurality of eNodeBs using the received power data and number data for the eNodeBs, and to receive the computed power level for each sub-band; wherein the processor is adapted to control the power level transmitted by the eNodeB in each sub-band to the inner and outer regions of a corresponding cell.

In one embodiment the computer system further processes the power data and the number data to allocate the sub-bands to be used by the eNodeB, the allocation of the sub-bands is received with the computed power level, and the sub-bands used for transmission are allocated accordingly.

In one embodiment the number data is determined to comprise an indication of the number of user equipments in the outer region relative to the number of all user equipments in a cell.

In one embodiment the power data is determined to be indicative of an average received power level for a signal from the eNodeB for all user equipments in the outer region of a cell.

In one embodiment each eNodeB communicates with user equipments in plurality of cells lying in a plurality of different sectors around the eNodeB, each sector having a respective outer region, and the power data and the number data is determined by an eNodeB for each cell.

In one embodiment further comprising transmitting further power data to the computer system, the further power data being indicative of a received power level for a signal from the eNodeB for at least one user equipment in the outer region of a cell after the control of the power level transmitted by the eNodeB in each sub-band, for the determination of whether the inter-cell interference has improved by the computer system, to modify the computing of the power level for use in future computations if not.

One embodiment of the invention provides a system in a base station in a wireless network, the system comprising an antenna arrangement for transmitting signals to and receiving signals from user equipments in a communications cell; a processor for determining power data indicative of a received power level for a signal from the antenna arrangement received by any user equipment in an outer region of a cell, and number data indicating at least one of a number and a relative number of user equipments within the outer region of a cell, the number data being determined from the timing of a signal between the antenna arrangement and the user equipment, the outer region of each cell being adjacent to the outer region of neighboring cells; and an interface to transmit the power data and the number data to a computer system to compute a power level in each of a plurality of sub-bands for transmission by the antenna arrangement, the computing system computing the power level for a plurality of base stations using the received power data and number data for the base stations; and to receive the computed power level in each sub-band; wherein the processor is adapted to control the power level transmitted by the antenna arrangement in each sub-band to the inner and outer regions of a cell.

In this embodiment, the processor can comprise any form of processor means, which can comprise one or a plurality of processors, one or a plurality of micro-processors, one or a plurality of Application Specific Integrated Circuits (ASICS), or one or a plurality of processing devices.

In this embodiment, the interface can comprise any form of interface means, which can comprise a parallel interface, serial interface, USB interface, network interface such as a local area network interface (LAN), wide area network interface (WAN), virtual private network interface (VPN) or other interface to the internet.

In one embodiment the computer system further processes the power data and the number data to allocate the sub-bands to be used by the base station, the interface is adapted to receive the allocation of the sub-bands with the computed power level, and the processor is adapted to use the allocated sub-bands for transmission accordingly.

In one embodiment the processor is adapted to determine the number data to comprise an indication of the number of user equipments in the outer region relative to the number of all user equipments in a cell.

In one embodiment the processor is adapted to determine the power data to be indicative of an average received power level for a signal from the antenna arrangement for all user equipments in the outer region of a cell.

In one embodiment each base station communicates with user equipments in plurality of cells lying in a plurality of different sectors around the base station, each sector having a respective outer region, and the processor is adapted to determine the power data and the number data for each cell.

In one embodiment the interface is adapted to transmit further power data to the computer system, the further power data being indicative of a received power level for a signal from the antenna arrangement for at least one user equipment in the outer region of the cell after the control of the power level transmitted by the base station in each sub-band, for the determination of whether the inter-cell interference has improved by the computer system, to modify the computing of the power level for use in future computations if not.

In one embodiment the wireless network comprises a $3^{rd}$ Generation Partnership Project (3GPP) Long-Term Evolution (LTE) network, the base station comprises an eNodeB, the timing signal is a timing advance signal used to maintain uplink time alignment, and the transmit power level comprises a Reference Signal Receive Power (RSRP) for each user equipment (UE).

One embodiment of the invention provides a non-transient storage medium storing code for controlling a base station to manage inter-cell interference from a plurality of neighboring wireless communication cells in a wireless network, the storage medium storing code to control a processor to determining power data indicative of a received power level for a signal from the base station for any user equipment in an outer region of a cell, and number data indicating at least one of a number and a relative number of user equipments within the outer region of a cell, the number data being determined from the timing of a signal between the base station and the user equipment, the outer region of each cell abutting the outer region of neighboring cells; code to control a processor to transmit the power data and the number data to a computer system to compute a power level in each of a plurality of sub-bands for transmission by the base station, the computing system computing the power level for a plurality of base stations using the received power data and number data for the base stations; and to receive the computed power level in each sub-band; and code to control a processor to control the power level transmitted by the base station in each sub-band to the inner and outer regions of a cell.

In one embodiment the code further comprises code to control the processor to process the power data and the number data to allocate the sub-bands to be used by the base station, code to control the processor to receive the allocation of the sub-bands with the computed power level, and code to control the processor to use the allocated sub-bands for transmission accordingly.

In one embodiment the code includes code to control the processor to determine the number data to comprise an indication of the number of user equipments in the outer region relative to the number of all user equipments in a cell.

In one embodiment the code comprises code to control the processor to determine the power data to be indicative of an average received power level for a signal from the base station for all user equipments in the outer region of a cell.

In one embodiment each base station communicates with user equipments in plurality of cells lying in a plurality of different sectors around the base station, each sector having a respective outer region, and the processor is adapted to determine the power data and the number data for each cell.

In one embodiment the code includes code to control the processor to transmit further power data to the computer system, the further power data being indicative of a received power level for a signal from the base station for at least one user equipment in the outer region of a cell after the control of the power level transmitted by the base station in each sub-band, for the determination of whether the inter-cell interference has improved by the computer system, to modify the computing of the power level for use in future computations if not.

In one embodiment the wireless network comprises a $3^{rd}$ Generation Partnership Project (3GPP) Long-Term Evolution (LTE) network, the base station comprises an eNodeB, the timing signal is a timing advance signal used to maintain uplink time alignment, and the transmit power level comprises a Reference Signal Receive Power (RSRP) for each user equipment (UE).

One embodiment provides a method of operating a base station to manage inter-cell interference from a plurality of neighboring wireless communication cells in a wireless network, the method comprising determining power data indicative of a received power level for a signal from a base station for any user equipment in an outer region of a cell, the outer region of each cell abutting the outer region of neighboring cells, and for determining number data indicating at least one of a number and a relative number of user equipments within the outer region of a cell, the number data being determined from the timing of a signal between the base station and the user equipment; transmitting the power data and the number data to a computer system to compute a power level in each of a plurality of sub-bands for transmission by the base station, the computing comprising computing the power level for a plurality of base stations using the received power data and number data for the base stations; receiving the computed power level for each sub-band; and controlling the power level transmitted by the base station in each sub-band to the inner and outer regions of a corresponding cell.

In one embodiment the computer system further processes the power data and the number data to allocate the sub-bands to be used by the base station, the method including receiving the allocation of the sub-bands with the computed power level, and using the allocated sub-bands for transmission accordingly.

In one embodiment the number data is determined to comprise an indication of the number of user equipments in the outer region relative to the number of all user equipments in a cell.

In one embodiment the power data is determined to be indicative of an average received power level for a signal from the base station for all user equipments in the outer region of a cell.

In one embodiment each base station communicates with user equipments in plurality of cells lying in a plurality of different sectors around the base station, each sector having a respective outer region, and the power data and the number data are determined by a base station for each cell.

In one embodiment the method includes transmitting further power data to the computer system, the further power data being indicative of a received power level for a signal from the base station for at least one user equipment in the outer region of a cell after the control of the power level transmitted by the base station in each sub-band, for the determination of whether the inter-cell interference has improved by the computer system, and modifying the computing of the power level for use in future computations if not.

In one embodiment the wireless network comprises a 3rd Generation Partnership Project (3GPP) Long-Term Evolution (LTE) network, the base station comprises an eNodeB, the timing signal is a timing advance signal used to maintain uplink time alignment, and the received power level comprises a Reference Signal Receive Power (RSRP) for each user equipment (UE).

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed:

1. A method of managing inter-cell interference for a plurality of neighboring wireless communication cells in a wireless network, the method comprising:

receiving, from each of a plurality of base stations, power data indicative of a received power level for a signal from the base station for any user equipment in an outer region of a cell, and number data indicating at least one of a number and a relative number of user equipments within the outer region of a cell, the number data being obtained at each base station from the timing of a signal between the base station and the user equipment, the outer region of each cell abutting the outer region of neighboring cells;

processing the received data for the cells to compute a power level in each of a plurality of sub-bands for transmission by each base station; and transmitting the computed power level in each sub-band to each base station for the control of the power level transmitted by the base station in each sub-band to the inner and outer regions of a corresponding cell.

2. A method according to claim 1, wherein received data for the cells is further processed to allocate the sub-bands to be used, and the allocation of the sub-bands is transmitted with the computed power level to each base station.

3. A method according to claim 1, wherein the number data received from each base station comprises an indication of the number of user equipments in the outer region relative to the number of all user equipments in a cell.

4. A method according to claim 1, wherein the power data from each base station is indicative of an average received power level for a signal from the base station for all user equipments in the outer region of a cell.

5. A method according to claim 1, wherein each base station communicates with user equipments in a plurality of cells lying in a plurality of different sectors around the base station, each sector having a respective outer region, and the power data and the number data is determined by a base station for each cell.

6. A method according to claim 1, further comprising receiving further power data indicative of a received power level for a signal from the base station for at least one user equipment in the outer region of a cell after the control of the power level transmitted by the base station in each sub-band, determining if the inter-cell interference has improved, and if not, modifying the computing of the power level for use in future computations.

7. A method according to claim 1, wherein the wireless network comprises a 3rd Generation Partnership Project (3GPP) Long-Term Evolution (LTE) network, the base station comprises an eNodeB, the timing signal is a timing advance signal used to maintain uplink time alignment, and the received power level comprises a Reference Signal Receive Power (RSRP) for each user equipment (UE).

8. A computer apparatus for managing inter-cell interference for a plurality of neighboring wireless communication cells in a wireless network, the apparatus comprising:

an interface for receiving, from each of a plurality of base stations, power data indicative of a received power level for a signal from the base station for any user equipment in an outer region of a cell, and number data indicating at least one of a number and a relative number of user equipments within the outer region of a cell, the number data being obtained at each base station from the timing of a signal between the base station and the user equipment, the outer region of each cell abutting the outer region of neighboring cells; and a processor for processing the received data for the cells to compute a power level in each of a plurality of sub-bands for transmission by each base station;

wherein the interface is adapted to be controlled by the processor to transmit the computed power level in each sub-band to each base station for the control of the power level transmitted by the base station in each sub-band to the inner and outer regions of a corresponding cell.

9. A computer apparatus according to claim 8, wherein the number data received from each base station comprises an indication of the number of user equipments in the outer region relative to the number of all user equipments in a cell.

10. A computer apparatus according to claim 8, wherein the power data from each base station is indicative of an average received power level for a signal from the base station for all user equipments in the outer region of a cell.

11. A computer apparatus according to claim 8, wherein each base station communicates with user equipments in plurality of cells lying in a plurality of different sectors around the base station, each sector having a respective outer region, and the power data and the number data is determined by a base station for each cell.

12. A computer apparatus according to claim 8, wherein the network interface is further adapted to receive further power data indicative of a received power level for a signal from the base station for at least one user equipment in the outer region of a cell after the control of the power level transmitted by the base station in each sub-band, the processor is adapted to determine if the inter-cell interference has improved, and if not, to modify the computing of the power level for use in future computations.

13. A computer apparatus according to claim 8, wherein the wireless network comprises a 3rd Generation Partnership Project (3GPP) Long-Term Evolution (LTE) network, the base station comprises an eNodeB, the timing signal is a timing advance signal used to maintain uplink time alignment, and the received power level comprises a Reference Signal Receive Power (RSRP) for each user equipment (UE).

14. An eNodeB base station for managing inter-cell interference from a plurality of neighboring wireless communication cells in a 3rd Generation Partnership Project (3GPP) Long Term Evolution (LTE) network, the eNodeB comprising a processor for determining power data indicative of a received power level for a signal from the eNodeB for any user equipment in an outer region of a cell, the received power level comprising a Reference Signal Receive Power (RSRP) for each user equipment, the outer region of each cell abutting the outer region of neighboring cells, and for determining number data indicating at least one of a number and a relative number of user equipments within the outer region of a cell, the number data being determined from the timing of a signal between the eNodeB and the user equipment, the timing signal being a timing advance signal used to maintain uplink time alignment; and an interface to transmit the power data and the number data to a computer system to compute a power level in each of a plurality of sub-bands for transmission by the eNodeBs, the computing comprising computing the power level for a plurality of eNodeBs using the received power data and number data for the eNodeBs, and to receive the computed power level for each sub-band;

wherein the processor is adapted to control the power level transmitted by the eNodeB in each sub-band to the inner and outer regions of a corresponding cell.

15. An eNodeB base station according to claim 14, wherein the computer system further processes the power data and the number data to allocate the sub-bands to be used by the eNodeB, the allocation of the sub-bands is received with the computed power level, and the sub-bands used for transmission are allocated accordingly.

16. An eNodeB base station according to claim 14, wherein the number data is determined to comprise an indication of the number of user equipments in the outer region relative to the number of all user equipments in a cell.

17. An eNodeB base station according to claim 14, wherein the power data is determined to be indicative of an average received power level for a signal from the eNodeB for all user equipments in the outer region of a cell.

18. An eNodeB base station according to claim 14, wherein each eNodeB communicates with user equipments in plurality of cells lying in a plurality of different sectors around the eNodeB, each sector having a respective outer region, and the power data and the number data is determined by an eNodeB for each cell.

19. An eNodeB base station according to claim 14, wherein the interface is adapted to transmit further power data to the computer system, the further power data being indicative of a received power level for a signal from the eNodeB for at least one user equipment in the outer region of a cell after the control of the power level transmitted by the eNodeB in each sub-band, for the determination of whether the inter-cell interference has improved by the computer system, to modify the computing of the power level for use in future computations if not.

20. A system in a base station in a wireless network, the system comprising:
an antenna arrangement for transmitting signals to and receiving signals from user equipments in a communications cell;
a processor for determining power data indicative of a received power level for a signal from the antenna arrangement received by any user equipment in an outer region of a cell, and number data indicating at least one of a number and a relative number of user equipments within the outer region of a cell, the number data being determined from the timing of a signal between the antenna arrangement and the user equipment, the outer region of each cell being adjacent to the outer region of neighboring cells; and
an interface to transmit the power data and the number data to a computer system to compute a power level in each of a plurality of sub-bands for transmission by the antenna arrangement, the computing system computing the power level for a plurality of base stations using the received power data and number data for the base stations, and to receive the computed power level in each sub-band;
wherein the processor is adapted to control the power level transmitted by the antenna arrangement in each sub-band to the inner and outer regions of a cell.

21. A system according to claim 20, wherein the computer system further processes the power data and the number data to allocate the sub-bands to be used by the base station, and the interface is adapted to receive the allocation of the sub-bands with the computed power level, and the processor is adapted to use the allocated sub-bands for transmission accordingly.

22. A system according to claim 20, wherein the processor is adapted to determine the number data to comprise an indication of the number of user equipments in the outer region relative to the number of all user equipments in a cell.

23. A system according to claim 20, wherein the processor is adapted to determine the power data to be indicative of an average received power level for a signal from the antenna arrangement for all user equipments in the outer region of a cell.

24. A system according to claim 20, wherein each base station communicates with user equipments in plurality of cells lying in a plurality of different sectors around the base station, each sector having a respective outer region, and the processor is adapted to determine the power data and the number data for each cell.

25. A system according to claim 20, wherein the interface is adapted to transmit further power data to the computer system, the further power data being indicative of a received power level for a signal from the antenna arrangement for at least one user equipment in the outer region of the cell after the control of the power level transmitted by the base station in each sub-band, for the determination of whether the inter-cell interference has improved by the computer system, to modify the computing of the power level for use in future computations if not.

26. A system according to claim 20, wherein the wireless network comprises a 3rd Generation Partnership Project (3GPP) Long-Term Evolution (LTE) network, the base station comprises an eNodeB, the timing signal is a timing advance signal used to maintain uplink time alignment, and the transmit power level comprises a Reference Signal Receive Power (RSRP) for each user equipment (UE).

27. A method of operating a base station to manage inter-cell interference from a plurality of neighboring wireless communication cells in a wireless network, the method comprising:
determining power data indicative of a received power level for a signal from a base station for any user equipment in an outer region of a cell, the outer region of each cell abutting the outer region of neighboring cells, and for determining number data indicating at least one of a number and a relative number of user equipments within the outer region of a cell, the number data being determined from the timing of a signal between the base station and the user equipment;
transmitting the power data and the number data to a computer system to compute a power level in each of a plurality of sub-bands for transmission by the base station, the computing comprising computing the power level for a plurality of base stations using the received power data and number data for the base stations;
receiving the computed power level for each sub-band; and
controlling the power level transmitted by the base station in each sub-band to the inner and outer regions of a corresponding cell.

28. A method according to claim 27, wherein the computer system further processes the power data and the number data to allocate the sub-bands to be used by the base station, the method including receiving the allocation of the sub-bands with the computed power level, and using the allocated sub-bands for transmission accordingly.

29. A method according to claim 27, wherein the number data is determined to comprise an indication of the number of user equipments in the outer region relative to the number of all user equipments in a cell.

30. A method according to claim 27, wherein the power data is determined to be indicative of an average received power level for a signal from the base station for all user equipments in the outer region of a cell.

31. A method according to claim 27, wherein each base station communicates with user equipments in plurality of cells lying in a plurality of different sectors around the base station, each sector having a respective outer region, and the power data and the number data are determined by a base station for each cell.

32. A method according to claim 27, including transmitting further power data to the computer system, the further power data being indicative of a received power level for a signal from the base station for at least one user equipment in the outer region of a cell after the control of the power level transmitted by the base station in each sub-band, for the determination of whether the inter-cell interference has improved by the computer system, and modifying the computing of the power level for use in future computations if not.

33. A method according to claim 27, wherein the wireless network comprises a 3rd Generation Partnership Project (3GPP) Long-Term Evolution (LTE) network, the base station comprises an eNodeB, the timing signal is a timing advance signal used to maintain uplink time alignment, and the received power level comprises a Reference Signal Receive Power (RSRP) for each user equipment (UE).

34. A non-transient storage medium storing code for controlling a computer system to manage inter-cell interference for a plurality of neighboring wireless communication cells in a wireless network, the code comprising:
    code for controlling the computer system to receive, from each of a plurality of base stations, power data indicative of a received power level for a signal from the base station for an user equipment in an outer region of a cell, and number data indicating at least one of a number and a relative number of user equipments within the outer region of a cell, the number data being obtained at each base station from the timing of a signal between the base station and the user equipment, the outer region of each cell abutting the outer region of neighboring cells;
    code for controlling the computer system to process the received data for the cells to compute a power level in each of a plurality of sub-bands for transmission by each base station; and
    code for controlling the computer system to transmit the computed power level in each sub-band to each base station for the control of the power level transmitted by the base station in each sub-band to the inner and outer regions of a corresponding cell.

35. A non-transient storage medium storing code for controlling a base station to manage inter-cell interference from a plurality of neighboring wireless communication cells in a wireless network, the code comprising:
    code for controlling the base station to determine power data indicative of a received power level for a signal from a base station for any user equipment in an outer region of a cell, the outer region of each cell abutting the outer region of neighboring cells, and for determining number data indicating at least one of a number and a relative number of user equipments within the outer region of a cell, the number data being determined from the timing of a signal between the base station and the user equipment;
    code for controlling the base station to transmit the power data and the number data to a computer system to compute a power level in each of a plurality of sub-bands for transmission by the base station, the computing comprising computing the power level for a plurality of base stations using the received power data and number data for the base stations;
    code for controlling the base station to receive the computed power level for each sub-band; and
    controlling the power level transmitted by the base station in each sub-band to the inner and outer regions of a corresponding cell.

* * * * *